United States Patent [19]
Gardner et al.

[11] Patent Number: 5,458,708
[45] Date of Patent: Oct. 17, 1995

[54] METHOD AND APPARATUS FOR MAKING SPIRAL WOUND SLEEVES FOR PRINTING CYLINDERS AND PRODUCT THEREOF

[75] Inventors: Roland C. Gardner, Doylestown, Pa.; Lawrence M. Knorr, Wilmington, Del.; Ronald F. McConnell, West Chester, Pa.

[73] Assignee: E. I. Du Pont de Nemours and Company, Wilmington, Del.

[21] Appl. No.: 120,159

[22] Filed: Sep. 15, 1993

Related U.S. Application Data

[62] Division of Ser. No. 54,210, Apr. 30, 1993, Pat. No. 5,301,610.

[51] Int. Cl.$^6$ ............................................... B65H 18/00
[52] U.S. Cl. ..................... 156/64; 156/187; 156/195; 156/259; 156/353; 242/911
[58] Field of Search ........................... 156/185, 187, 156/188, 190, 191, 192, 193, 195, 211, 259, 425, 429, 430, 431, 432, 64, 353; 493/302, 303; 242/554.2, 911

[56] References Cited

U.S. PATENT DOCUMENTS

| | | | |
|---|---|---|---|
| 3,524,779 | 8/1970 | Masters et al. | 156/195 X |
| 3,960,624 | 6/1976 | Erlandson | 493/302 X |

*Primary Examiner*—David A. Simmons
*Assistant Examiner*—James J. Engel

[57] ABSTRACT

A printing sleeve for a flexographic printing process is prepared by spirally winding successive adhesive coated tapes onto a forming mandrel such that the outer tape covers the seam in the previous layer, providing heat to the thermoplastic adhesive layers at the initial contact point between two tapes, providing sufficient tension to ensure consolidation, and advancing the resultant printing sleeve off the mandrel by means of a drive belt.

2 Claims, 7 Drawing Sheets

FIG. 3

METHOD AND APPARATUS FOR MAKING SPIRAL WOUND SLEEVES FOR PRINTING CYLINDERS AND PRODUCT THEREOF

This is a division of application Ser. No. 08/054,210, filed Apr. 30, 1993 now U.S. Pat. No. 5,301,610.

BACKGROUND

This invention relates to a sleeve for use on a print cylinder, and more particularly, it relates to expandable sleeves which are readily mountable onto and dismountable from print cylinders using pressurized air to expand the sleeves for mounting and dismounting. This invention also includes a method and apparatus for forming the sleeves.

In the printing industry, flexible printing "plates" are mounted on sleeves that are readily and repeatably mounted and dismounted from the printing cylinders. The sleeves must be inexpensive, lightweight, resistant to handling damage, and able to withstand several expansions and still reliably grip the print cylinder without slippage (i.e. elastically expandable diametrically). Typically an interference fit with the print cylinder of from 3 to 15 mils is preferred. The sleeves should be expandable with the 40–100 psig air generally available in printing facilities and should expand sufficiently so they are easily slid over the print cylinder, so typically an expansion exceeding the amount of interference fit is required. The sleeves typically have a wall thickness of from about 10 to 40 mils or more.

There is also a need for a sleeve with a precision outer surface which is free of irregularities that cause printing defects and which has a uniform wall thickness that results in a difference in diameter (or trueness, or runout) of the outer wall surface when mounted on a true cylinder of less than 5 mils and preferably less than 1 mil. The surface irregularities must be minimized since the sleeves are occasionally used with printing plates made of a thin photopolymer laminates only 30–125 mils thick mounted with an adhesive layer only 15–20 mils thick. If the printing sleeve is made by helically winding tapes in layers, the tapes must never overlap themselves, and for high quality printing the helical gap between tape edges should be less than 35 mils on the outer surface and preferably less than 20 mils. Gaps at the inner layers are preferably less than 50 mils. A large gap on the outer surface may allow the printing plate to depress into the gap due to print machine pressure as the ink is applied to the plate and transferred from the plate to the paper, thereby producing a poorly printed image on the paper. A large gap on the inner surface may cause excess leakage of the pressurized air for mounting the sleeve.

There is also a need for a sleeve that can be elastically expanded repeatedly to grip the print cylinder firmly to prevent slipping of the sleeve on the cylinder during use. It would be useful to have an expansion of at least 20 mils across the diameter when 40–60 psi fluid pressure is applied (measured by applying pressure to a sealed sleeve acting as a closed cylinder). The elastic expandable sleeve must also have a minimum stiffness across the diameter. There is a need for diametral stiffness for ease of mounting and when the sleeve is dismounted from the print cylinder so the sleeve does not sag with normal handling or during horizontal storage thereby causing distortion in the print plate and sleeve that makes re-mounting the sleeve a problem. The combined features of high expandability and sufficient stiffness are difficult to achieve in a single sleeve structure.

There are many different diameter printing sleeves employed and many different length sleeves. An economical manufacturing process for making sleeves is to make the sleeves on a spiral tube winding machine which permits continuous operation with a simple inexpensive piece of equipment. The machine utilizes a cantilevered, rigid, stationary mandrel on which narrow tapes are guided at an angle to form a helical tubular structure on the mandrel. A drive belt, looped around drive drums and positioned at the same angle to the mandrel, wraps around the tubular tape structure and rotationally and axially propels the structure along the mandrel. At the unsupported end of the mandrel, the tubular structure is periodically cut across its axis to separate the finished product from the still-forming structure.

There is a need for a spiral tube manufacturing process that can provide a quality sleeve for short run lots where the diameter of the sleeve and thickness of the sleeve and hence the helical wrap angle of the sleeve can be readily changed with little waste of raw material or extensive set-up time. Several variables in the helical tube making process contribute to the difficulty of setting up such a process and achieving good running conditions in a short time and with a minimum of poor quality product waste.

Such variables are:

1) variations in the width of the tape supplied;
2) variations in the cut edge quality of the tapes supplied due to poor slitting that produces camber in the edge or edge damage during shipping and handling;
3) variations in the friction between the tapes and the mandrel;
4) variations in the drive belt tension that cause slipping of the belt on the tubular structure or slipping of the belt on the drive drums;
5) variations in the speed of the drive drums for the belt;
6) variations in the angle of the drive belt during operation due to tension variations and slippage, and bending of the mandrel;
7) variations in the tension of the tapes fed to the mandrel;
8) variations in the angle of the tapes fed to the mandrel due to tape wandering (poor tape guiding);
9) inability of the operator to closely monitor the helical gap;
10) wear in the gear trains driving the belt drive drums that causes irregular speed changes in the belt;
11) inaccuracies in the drum diameters and gear train connecting the drums that results in dynamic friction on one drum (more variable than static friction) due to inability to match surface speeds when slightly different diameter drums are geared together.

As for variables due to variations in the speed of the drive drums and slippage of the belt on the drive drums in conventional spiral winding, a downstream drive drum is driven by a motor, and an upstream drive drum is driven by a mechanical linkage to the downstream drum, or is simply an idler. The disadvantages of these configurations are that in the first case employing a mechanical linkage to drive the upstream drum, the peripheral speed of both drive drums are generally not exactly equal due to normal machining and gearing tolerances and therefore the drive belt slides on at least one of the drive drums. This slippage causes a loss of driving power from the slipping drum, and also, potentially, variation in the drive belt speed which could adversely affect the stability of the tube being produced, principally in achieving a tight tolerance small gap between successive wraps. In the second case the upstream drum operates as simply an idler which removes the potential problems of belt slippage due to differential drum speed since the drum is free to rotate at the belt speed; however, the upstream drum applies no additional driving force to the belt and therefore the downstream drum must provide all the driving force, compensate for all torque variations in the tube making process, and rely on the frictional contact between the downstream driven drum and the belt for control. Belt slippage with this arrangement can also be a problem with high torque loads.

SUMMARY OF THE INVENTION

The invention is a cylindrical sleeve which is a multi-layer structure comprising at least two structural layers of heat stabilized, resinous material, the structural layers bonded together by at least one adhesive layer of heat meltable, thermoplastic, material. The adhesive layer is preferably a two-ply layer where two adhesive layers (plies) are blended where they join to appear as a single layer. The adhesive layers are relatively thick and are concentrated near the center of the multi-layer structure thickness; the structural layers are concentrated away from the center. It is believed that concentrating the structural layers away from the center results in a multi-layer structure that is stiffer than a similar structure where the structural layers are concentrated near the center. The thick adhesive layer allows for a simple multi-layer structure made from a minimum of layers. The sleeve can be designed for expansibility considering only two or three structural layers for strength and the remaining thickness requirements can be met with one or two adhesive layers. For large thickness requirements, this results in a simple structure having a uniform thickness that is economical to fabricate with few layers, and the thicker layers are made from a relatively inexpensive material not having critical strength requirements. A basic design can thereby be easily varied to provide varying uniform thicknesses without design time spent recalculating the expansibility strength requirements.

More particularly, the invention is a sleeve product made of a plurality of multi-layer, resinous tapes, each multi-layer tape including a thermoplastic adhesive layer thermally bonded to a resinous structural layer, with the outermost tapes thermally bonded to each other with the adhesive layers facing each other to form a relative thick, two-ply, adhesive layer, which comprises about 25–70% of the total wall thickness of the sleeve. The sleeve is elastically expandable so that the inner diameter of the sleeve is expandable at least 20 mils by the application of fluid pressure to the inner surface of the sleeve. The relatively thick adhesive layer concentrated near the center of the wall thickness comprises a significant portion of the sleeve and plays an important role in achieving the large expandability and stiffness of the sleeve. It separates the major load-carrying resinous layers apart which creates a beam structure with improved bending strength, i.e. good sleeve stiffness. In addition the sleeve is spiral wound forming a continuous spiral gap in the outer surface of the sleeve with a gap width of up to 35 mils. The gap is defined by opposed side walls and a bottom wall. The side walls comprise the outer resinous layer and a portion of the thermoplastic adhesive layer and the bottom wall comprises another portion of the thermoplastic adhesive layer. The invention includes a method of making a spiral wound sleeve where one adhesive coated tape is wrapped on a mandrel with the adhesive side facing away from the mandrel, another adhesive coated tape is wrapped onto the first tape with the adhesive side facing the first tape, and positioned to bridge the seam of the first tape. The adhesive coated sides of both tapes are heated at the nip formed as they come together on the mandrel to join the adhesive layers together without substantially heating the remainder of the tape.

The invention includes a method for rapidly setting up and achieving quality running conditions for continuously making a spiral wrapped sleeve with a narrow gap width in the outer tubular surface. The invention includes: tape width control and guiding by slitting adjacent the mandrel to maintain the predetermined gap; rapid heat transfer to and from an adhesive coating on the tape by applying heat directly to the adhesive coating on two mating tapes as they nip together tape on the unheated mandrel; uniform friction between tape and mandrel by providing an air cushion and a low friction mandrel surface; uniform belt speed by providing shared torque to the drive drums and fluid pressure-applied tension to the belt that results in minimal belt slippage on drums or sleeve, and insensitivity to friction variations of drums, belt, sleeve, or mandrel; on-line magnified video monitoring of the outer tape helical gap to assist in adjusting the slitter to minimize gap width rapidly at set-up and thereby reduce start-up waste and set-up time.

The invention encompasses a system for spiral winding tight tolerance tubing employing independent dual drives for both drums. This is accomplished by driving each drum by its own individual motor allowing additional force and torque transmission, while removing the slippage concern since the upstream drum is free of a mechanical linkage forcing its peripheral speed; it can transmit its torque load at the given drive belt speed. In a preferred embodiment of this dual independent drive system, each of the drives applies a portion of the torque required to turn the drive belt at a certain speed. In this configuration one drive may serve as a master and the other a follower. In this torque shared system, both drives operate with a minimum of slippage between the drive belt and the drums establishing a very stable drive system for spiral tube production.

DETAILED DESCRIPTION OF THE PREFERRED EMBODIMENT

Figure 1:
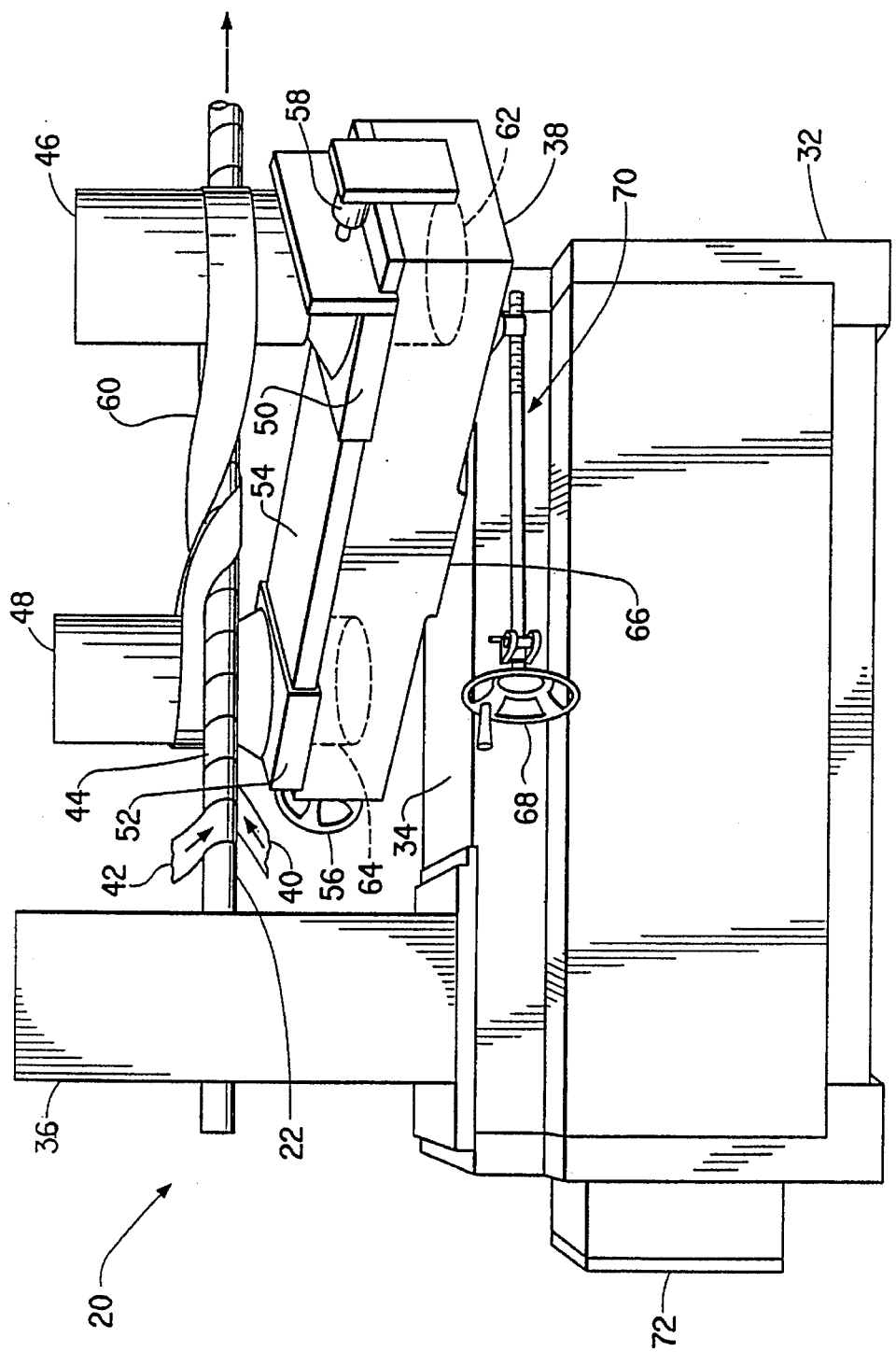
FIG. 1 shows a partial overall view of a spiral tube winding machine for continuously making the sleeve of the invention.
Figure 2:
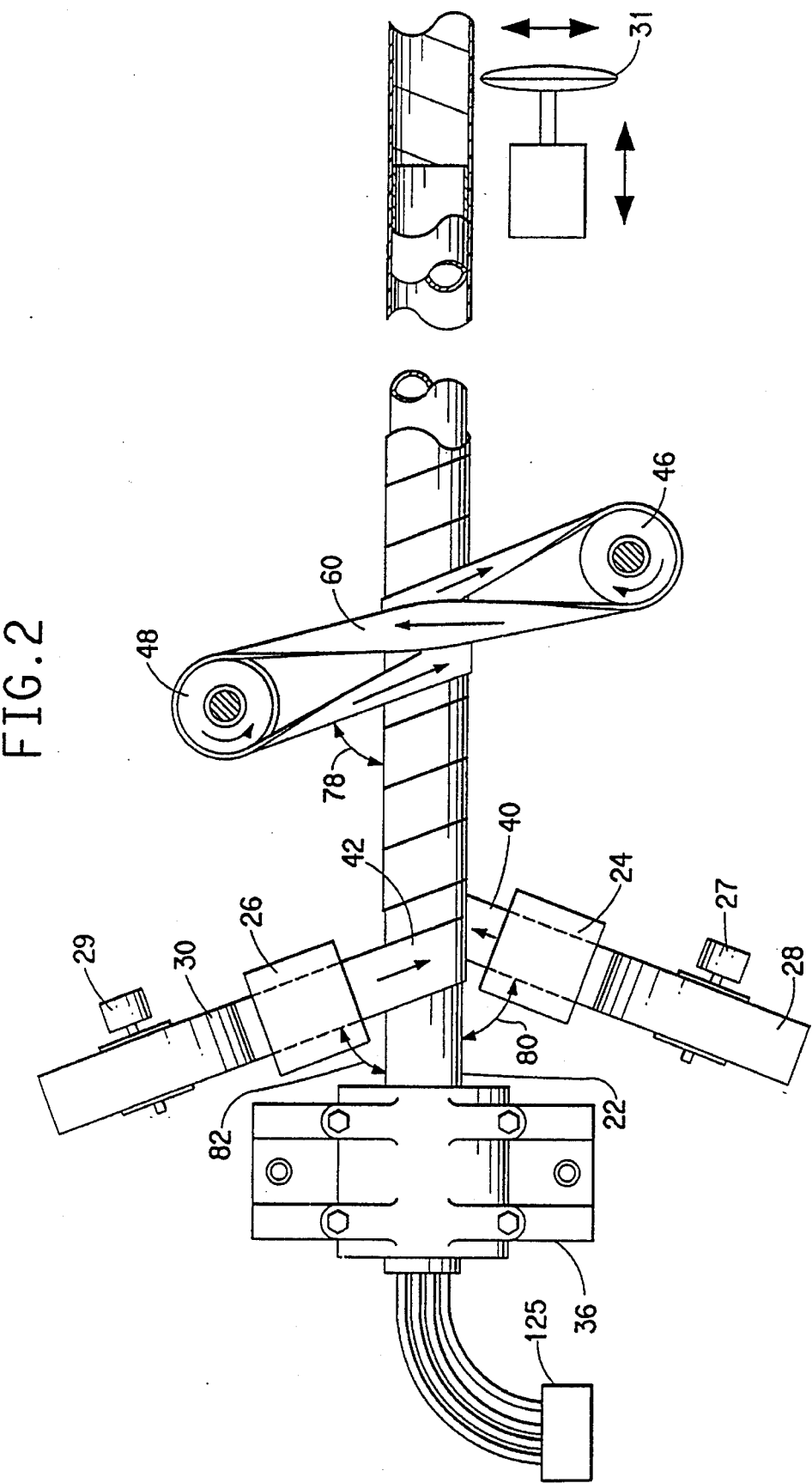
FIG. 2 shows a partial plan view of the mandrel and drive belt of FIG. 1.

FIG. 1 shows a partial overall view of a spiral tube winding machine 20 for continuously making the sleeve of the invention where the devices upstream of the point of winding each tape 40 and 42 on the mandrel 22 have been omitted for clarity. Such means are designated diagramatically in FIG. 2 by the tape slitting and guiding means 24 and 26 and the tape supply means 28 and 30 with tape tensioning means 27 and 29 for applying constant tension. The tape slitting and guiding means are further described referring to means 24 in FIG. 3. A cutting means 31, such as a rotary cutter, is provided to periodically engage the moving completed tube 44 to separate a completed piece of tube from the continuously forming tube.

The tube winding machine 20 comprises a frame 32 having a top surface 34 upon which a mandrel support 36 and belt carriage assembly 38 are attached. The mandrel 22 provides a smooth cylindrical surface for spirally winding a plurality of tapes, such as tapes 40 and 42 to make tube 44. The mandrel 22 is removably attached to the support 36 by conventional clamping means (not shown) so that different sized mandrels can be rapidly attached for making different tube sizes. The carriage 38 comprises drums 46 and 48 journaled to slideable bases 50 and 52 that are supported and guided by rail 54. Base 52 may be slid along rail 54 by rotation of hand wheel 56 that is connected to carriage 38 and engages base 52 through a conventional worm gear structure (not shown). Base 50 may be slid along rail 54 by a fluid cylinder 58 that is connected to carriage 38. The fluid cylinder 58 also provides a means for continuously maintaining tension in an endless drive belt 60 that is entrained about both drums 46 and 48 and tube 44 in a conventional manner. Drum 46 is rotationally attached to drive motor 62 mounted to base 50 and drum 48 is rotationally attached to drive motor 64 mounted to base 52. The carriage 38 is pivotally attached to frame 32 at pivot 66 and can be angularly adjusted and held in place by handwheel 68 attached to frame 32 and engaged with carriage 38 by a conventional threaded rod and captive nut structure designated by 70. The motors 62 and 64 are electrically connected to drive control 72 which controls the torque and speed of each motor independently of the other. The speed of the motors is set to be the same (assuming the drum diameters are the same), but the total torque required to propel drive belt 60 can be shared by adjusting the torque output by each motor; for instance, motor 62 may provide 50% of the required torque and motor 64 may provide 50%; or motor 62 may provide 60% of the required torque and motor 64 may provide the remaining 40%. By independently controlling the shared torque, uncontrolled slippage of one drum or the other with the belt is minimized and stabilized; this permits stable, reliable speed control of the belt and therefore of the tape winding propelled by the belt. This also permits control in the cinching action caused by the belt as it drives the sleeve, thereby permitting friction to be minimized between the sleeve and the mandrel during operation. In operation, drum 46 is the downstream drum and its speed is the set speed; drum 48 is the upstream drum and its speed adjusts to equal that of downstream drum 46. It has been discovered that a preferred torque share ratio is to have the upstream drum 48 provide more of the torque than the downstream drum 46, such as a 90/10 ratio. This results in lower mandrel deflection, less fluctuation in mandrel deflection and, it is believed, less cinching of the sleeve.

It may also be possible to drive only the upstream drum and control its speed directly, and let the downstream drum act as an idler drum. This goes against the teachings in the art where the downstream drum is driven and the upstream drum is the idler. Surprisingly, it has been found that if the upstream drum is the only driver, the bending fluctuations on the mandrel are reduced significantly, thereby reducing axial propulsion fluctuations of the belt on the tube 44 and fluctuating in the tape to mandrel angle; this results in a uniform gap.

Figure 3:
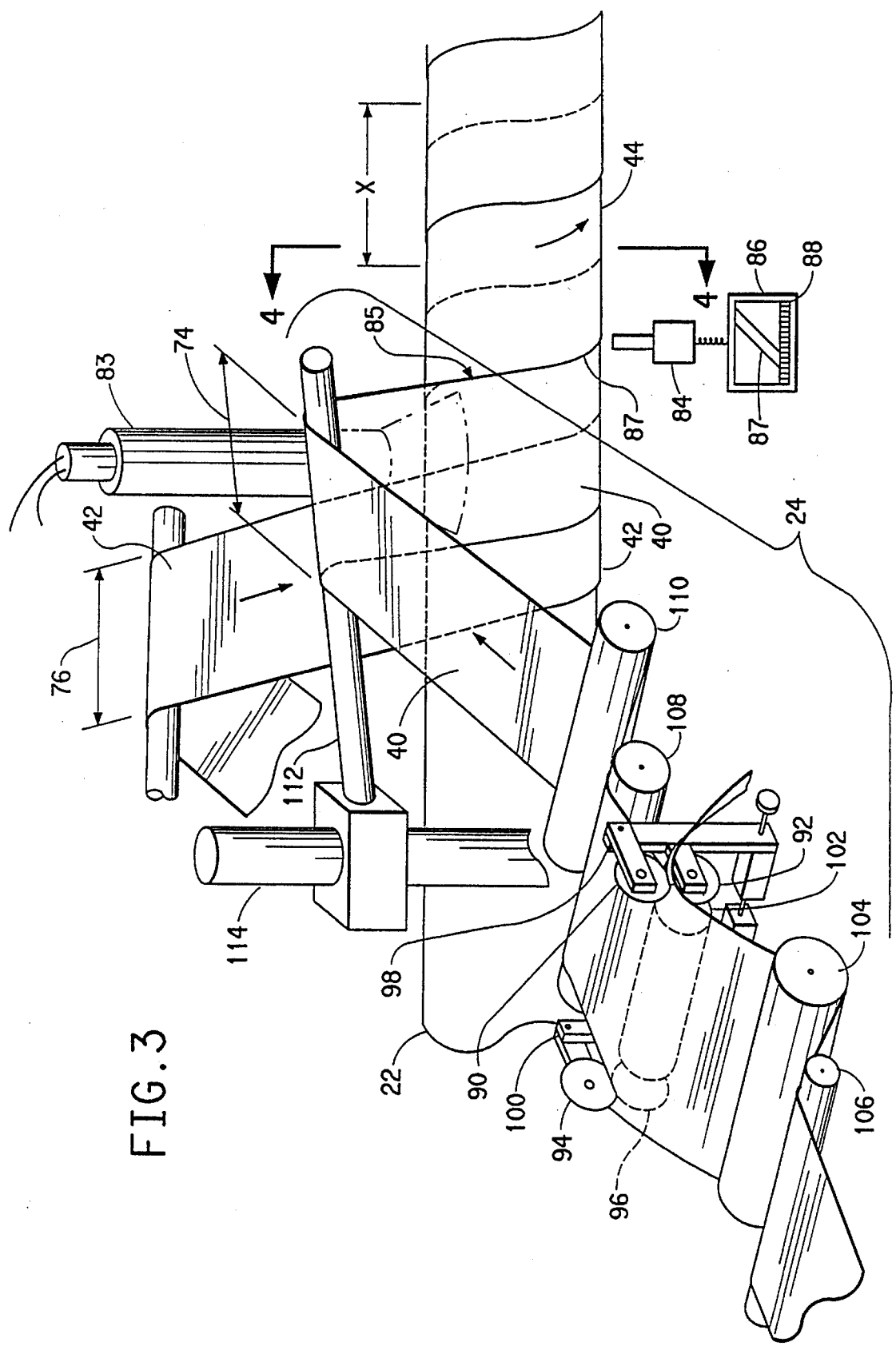
FIG. 3 shows a partial overall view of the tape slitting and guiding means, and means for heating the spirally winding tapes on the mandrel of FIG. 1.

FIG. 3 shows the tapes 40 and 42 winding onto the mandrel due to the action of the drive belt 60 (FIGS. 1 and 2) that rotationally and axially propels the tube 44 along the mandrel by means well known in the spiral tube winding art. For each rotation of the tube, the tube must advance along the mandrel by a distance X greater than the width 74 or 76 of the tapes 40 and 42 respectively being wound onto the mandrel. The distance X is related to the angle 78 (FIG. 2) that the belt 60 makes with the mandrel, the diameter of the mandrel, and the widths of the tapes used. The tapes 40 and 42 are wound onto the mandrel at angles 80 and 82 respectively that approximate the value of angle 78. For an ideal zero gap seam, X equals the tape width divided by the sine of the angle 78. If the distance X is less than ideal, the tapes will overlap themselves and form an overlapped spiral seam. If the distance X is greater than ideal, the tapes will be spaced from themselves and form a gapped spiral seam. The value of X is fairly sensitive to small variations in the belt angle 78; a simple means to correct for lack of an ideal situation, as taught by this invention, is to vary the width of the tapes close to the mandrel where they are being wound on. When making the sleeve of the invention it is always desired to make a narrow gapped spiral seam, but the width of the gap must be carefully controlled at a predetermined value; the spiral gap may be different or the same for each tape 40 and 42. Preferably, the gap for the inside diameter tape is controlled over a wider range between 0–50 mils and the gap for the outside diameter tape is controlled over a narrower range between 0–35 mils. Note that the inner tape 40 is wrapped around the outer diameter of the mandrel, and the outer tape 42 is wrapped around the outer diameter of the inner tape. To secure the outer tape to the inner tape, heating means 83 applies heat to the juncture or nip 85 where the two tape surfaces come together to soften the thermoplastic layers present there as will be discussed referring to FIG. 4. The tapes are wound onto the mandrel under tension which acts to consolidate the heated adhesive layers to bring the tapes into intimate contact and form a strong lamination. The angles of all the tapes are inclined in the same direction relative to the tube axis.

To control the spiral gap of the tapes and guide the tapes onto the mandrel, the conventional practice is to pre-slit the tapes off-line to the proper width and make small adjustments in the angles 78, 80, and 82 to achieve the desired gap. This requires a significant amount of trial and error that involves making a sufficient length of tube while waiting for the angular changes to completely equilibrate in the process. During this period, waste product is being made. For long runs lasting several hours or days, this may not be significant, but for short runs, it represents a high percentage of downtime and waste. Applicants have discovered that if the tape widths are slit on-line near the point of winding, this downtime and waste to achieve a small spiral gap can be considerably reduced so short runs are practical. To precisely control the spiral gap and guide the tapes onto the mandrel, the tapes are slit just before they are wound onto the mandrel. To accurately monitor the more critical spiral gap on the outer diameter of the tube, a video camera 84, connected to video monitor 86, is diagrammatically shown focussed on the spiral gap 87 after the outer tape 40 is completely wound onto the mandrel to complete the tube 44. The camera may be placed at any convenient rotational position around the mandrel, but preferable it is placed to look at the gap shortly after it is formed so any deviations can be detected quickly before a significant amount of unacceptable product is formed. The video image preferably magnifies the gap 100× so it can be easily seen and measured by the operator on the scale 88 placed on the video monitor screen. The operator can then manually adjust the slitting/guide means 24 a calculated to vary the tape width until the gap seen on the video screen returns to a preselected value. Since the slitting position is located near the wrapping tube and the video camera sensor, changes made to the slit width are rapidly incorporated in the wrapping tube to keep the gap near the predetermined width without making waste. To provide the precision necessary to reliably control the gap, the video camera/monitor gap sensing system should have an accuracy of about +/±2.5 mils. Alternatively, the video image could be automatically analyzed and a signal produced to automatically control the tape slitting/guiding means 24 to vary the width of the tape 40.

Conventional pairs of tape slitting wheels 90, 92, and 94, 96 are provided to slit the two edges of the tape 40 shown in FIG. 3. The pairs of wheels are attached to width-wise adjusting means 98 and 100 so pairs 90, 92 and 94, 96 respectively can be adjusted independently. Roll 102 supports the tape between the pairs of slitting wheels. Rolls 104 and 106 carry the tape through an S-wrap to guide it into the slitting wheels, the rolls 108 and 110 carry the tape through an S-wrap to guide the tape leaving the slitting wheels. The use of slitting and S-wrap guide rolls near where the tape is wound onto the mandrel permits precise edge guiding and width adjustment without pressing against the edges of the tape which may damage the edges and create uniformity problems in the quality of the wound tube. Fine adjustments in edge tension of the slit tape can be made by adjusting guide bar 112 about support 114 just before the tape is wound onto the mandrel. Although the tape slitting and guiding has been described only with respect to tape 40, the same system is applied to tape 42 and any other tapes that may be combined on the mandrel to form a tube 44. In the case of tape 42 and other inner tapes, the gap range permitted is larger than the critical outer tape gap, so video monitoring may not be required to detect an acceptable gap on these inner tapes during set-up and operation.

Figure 4:
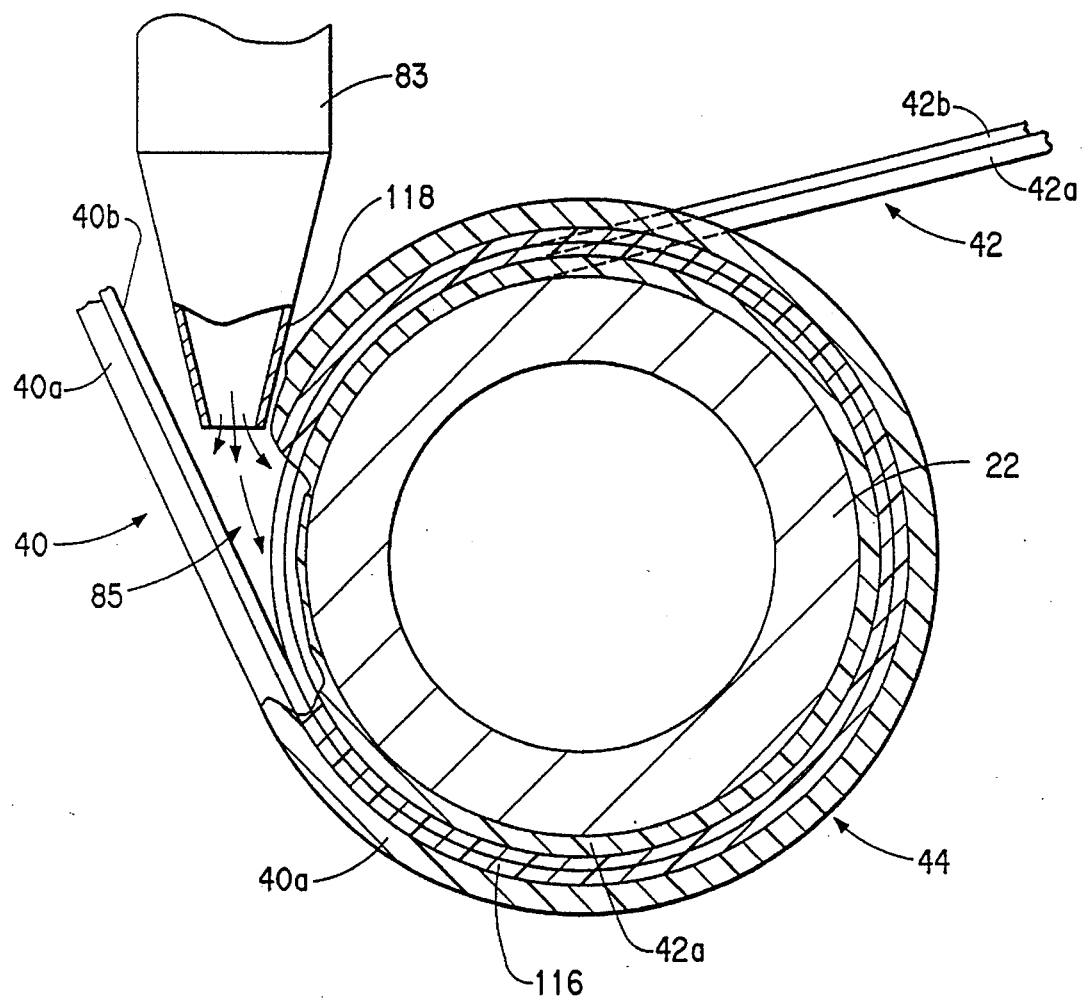
FIG. 4 shows an enlarged section view of the mandrel and sleeve taken along lines 4—4 of FIG. 3.

Referring to FIG. 4, the tapes used in making the sleeves preferably each comprise a multi-layer structure of a heat stabilized, resinous layer 40a and 42a, such as polyethylene terephthalate (Mylar®) film by DuPont, and a heat meltable, thermoplastic adhesive layer 40b and 42b. The resinous layer may be an oriented polymer. In addition to Mylar® polyester film; other materials may be useful for the structural layer such as polyvinyl resins, like polyvinyl chloride and polyvinyl acetate, and polystyrene. The adhesive of the invention is preferably a crystallizable polymer with a crystalline phase which exists below a melt point, and a viscous liquid phase above the melt point which is well above room-temperature, such as about 150–250 degrees F. In the crystalline phase, the adhesive has properties of a solid polymer. One such adhesive is sometimes referred to as a hot melt adhesive. In comparison, a contact adhesive is an amorphous polymer, not having a crystalline phase, and having properties of a highly viscous liquid at room temperature making its bonds more susceptible to creep. Some polymers having characteristics of the adhesive of the invention would be polyethylene, polypropylene, a copolymer of polyethylene and polypropylene, nylon, polyester, polyvinyl, etc. all of which must have melt points below the reorientation or softening temperature of the polymer of the structural layer. The tapes are arranged so that when they are wound together on the mandrel, the same or similar adhesive layers of the outermost tape and adjacent tape come together to form a single, relatively thick, two-ply adhesive layer 116. The two adhesive layers should belong to compatible chemical families so they combine easily, although some differences may exist, such as a difference in viscosity at the joining temperature. The two adhesive layers are combined into a single layer with the joint blended together by the application of heat from heating means 83 which may consist of a hot air blower with a nozzle 118 that directs the hot air across the width of tape 40 and toward the nip 85 where tape 40 meets tape 42 on the mandrel. The application of heat to the surface of the adhesive layers 40b and 42b just before and just as they join on the mandrel provides a highly efficient and easily controllable heating of the tapes for joining. The heat is applied only to the adhesive layers and only just before bonding without substantially heating the structural layers. "Without substantially heating" means the structural layers do not reach as high a temperature as the adhesive layer at the time that the adhesive layers come together and form the bond between the tapes. In one case for a 5¾" ID sleeve with a wall structure similar to FIG. 6C, when the temperature of the adhesive was about 240 degrees F. for joining, the surface of the structural layer on the outside of the sleeve was only about 170 degrees F. where the tapes came together at the nip. This is important to assist with rapid cooling of the adhesive after joining, and also for keeping the temperature of the adhesive joint low where it has been pre-applied to the structural layer. Heat may also be applied to the adhesive layers at the nip using other means, such as flame heating, microwave heating, ultrasonic heating, radiant heating and the like. The joining of one adhesive layer with another adhesive layer to form a two-ply adhesive layer provides a very strong bond with a high peel strength. Thermal bonding with thermoplastic adhesive layers is preferred over use of a contact adhesive not requiring heat, since the thermal bond has much higher peel strength and will withstand numerous expansions of the sleeve without delaminating or significantly creeping. After the tapes are joined at nip 85 to form tube 44, they are cooled by contact with the unheated structural layers 40a and 42a and by close proximity to the unheated mandrel 22. There is also an unheated supply of air providing a film of air between the tape 42 and the mandrel 22 to provide a low friction interface between the tube and mandrel that may also help cool the tube. Other means of cooling applied to the outside of the tube are also possible. The process of the invention produces a quality tube structure with good delamination resistance even after many expansions, small spiral gaps in the outer surface, and good wall thickness control so the outer diameter of the combined tape thicknesses in the sleeve is within 5 mils and preferably within 1 mil to 0.5 mil, of the maximum outer diameter of the sleeve when mounted with an interference fit on a perfect cylinder.

Figure 5:
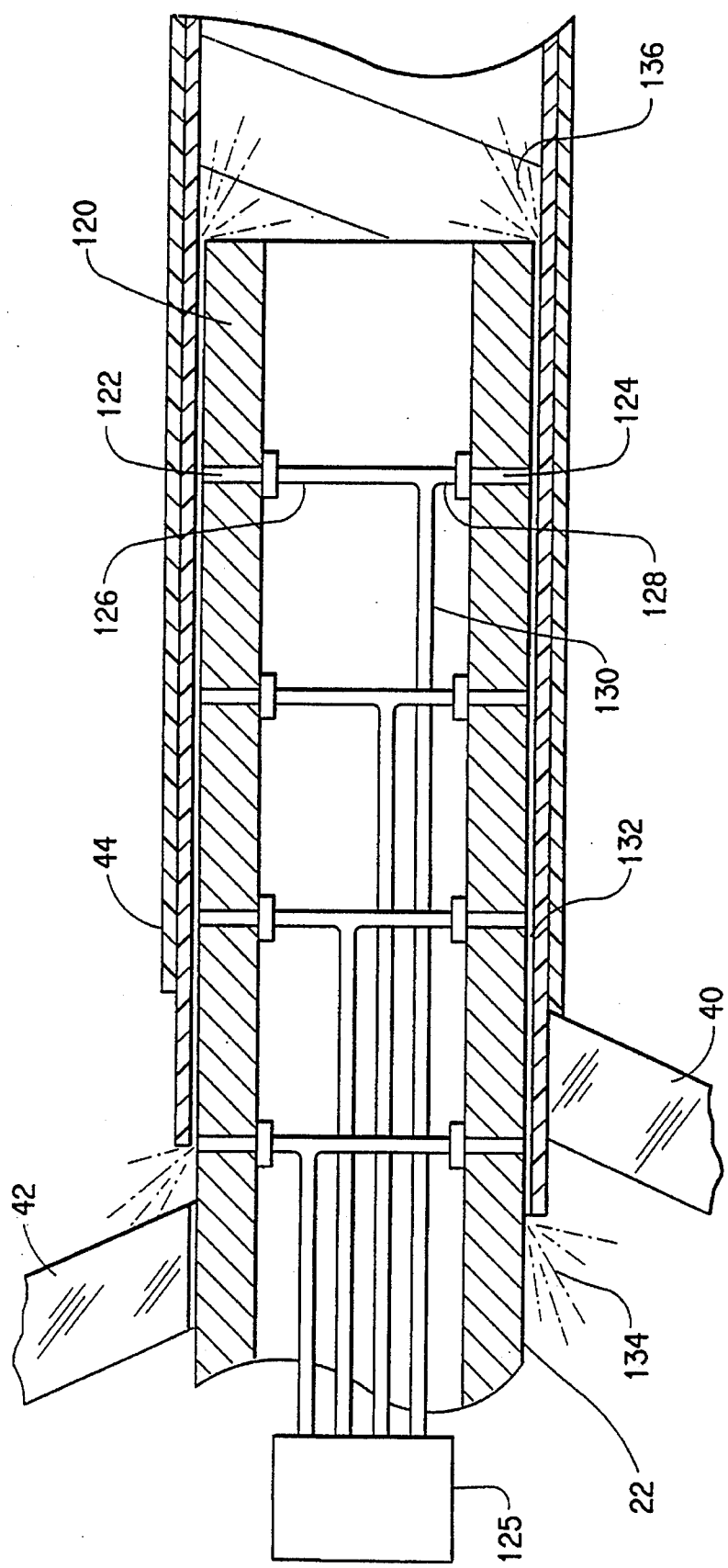
FIG. 5 shows details of the mandrel of FIGS. 1 and 2.

FIG. 5 shows details of the mandrel 22 which consists of a shell material 120 having a plurality of axially and radially distributed ports, such as 122 and 124, that are connected to a source of pressurized air 125 by conduits, such as 126 and 128 that may be manifolded together to feed conduit 130. When the tube 44 is in place on the mandrel, the pressurized air issuing from the plurality of ports, such as 122 and 124 provide a cylindrical film of air 132 around the mandrel that supports the tube. The film of air 132 flows to the surroundings at the end of the tube, such as at 134, where the tapes 40 and 42 are being wrapped, and at the end of the mandrel, such as at 136. The film of air provides a consistent low friction interface between the mandrel and the tube. The shell material 120 is preferably a rigid material with a low surface coefficient of friction, relative to the tube material contacting it, to minimize frictional resistance to tube motion during start-up and occasional contact between the tube and shell. Since the mandrel is hollow and open at both ends, cooling media may be directed through the mandrel to further assist in tube cooling.

Figure 6A:
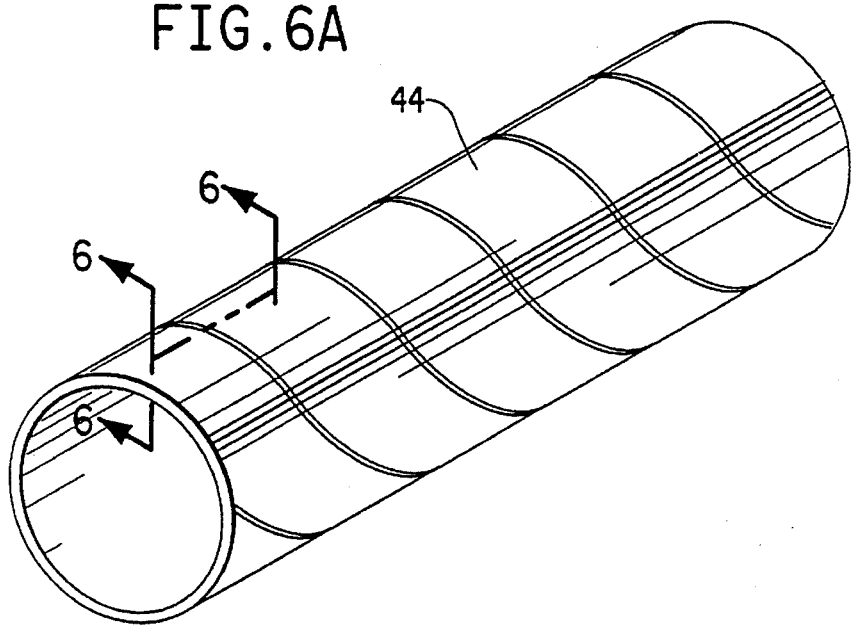
FIGS. 6A, 6B, 6C and 6D show the sleeve of this invention along with enlarged cross-section views of the wall thickness of three embodiments of the sleeves of the invention.
Figure 6B:
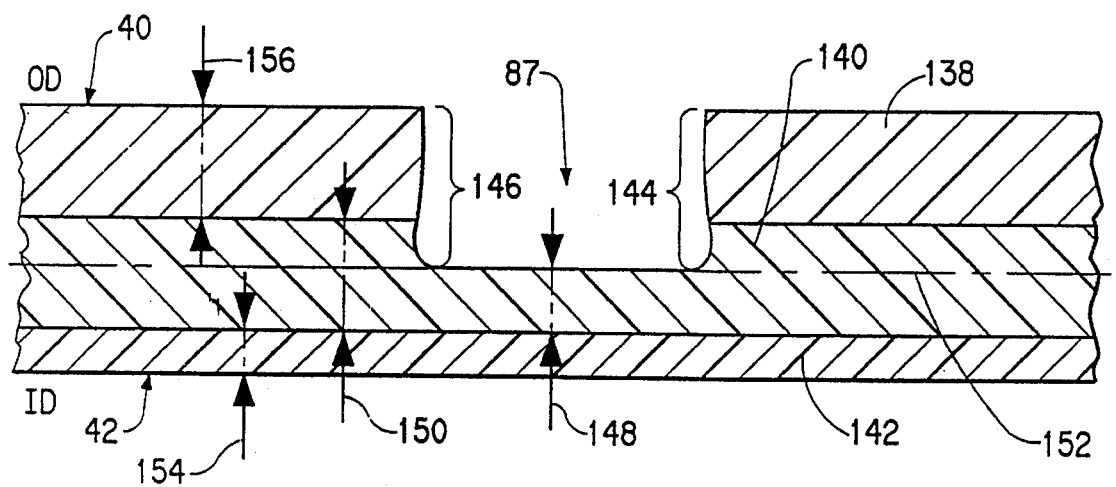
Figure 6C:
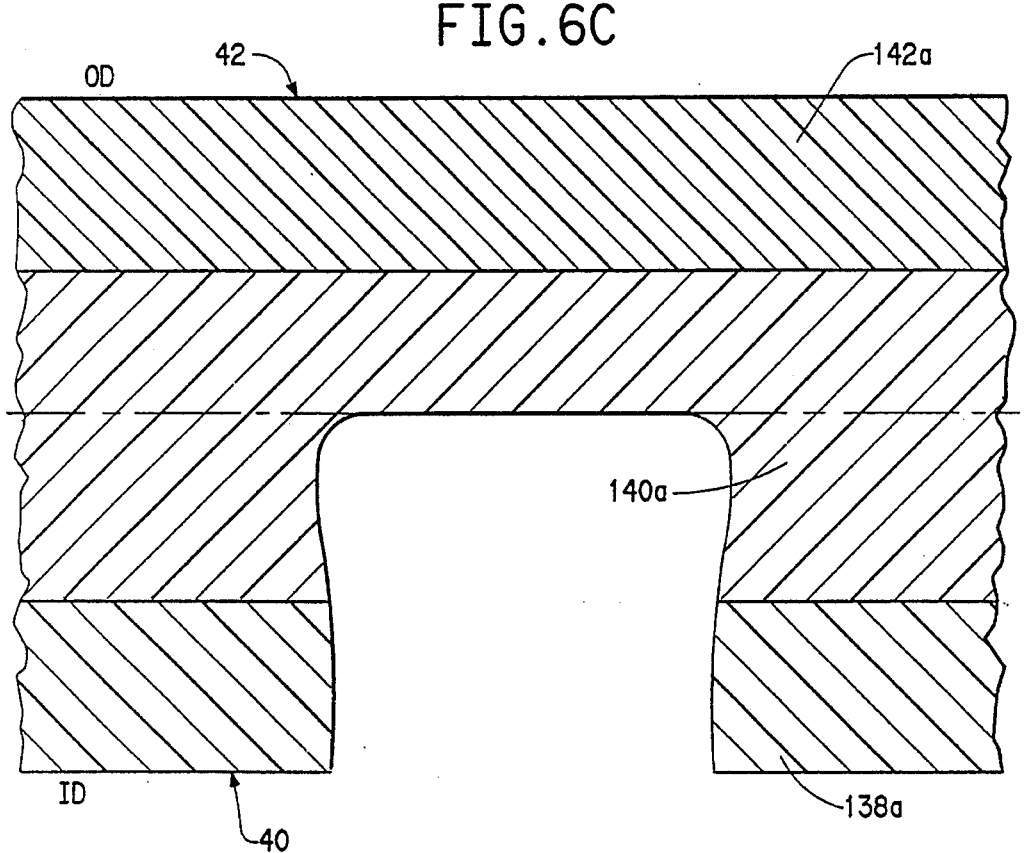
Figure 6D:
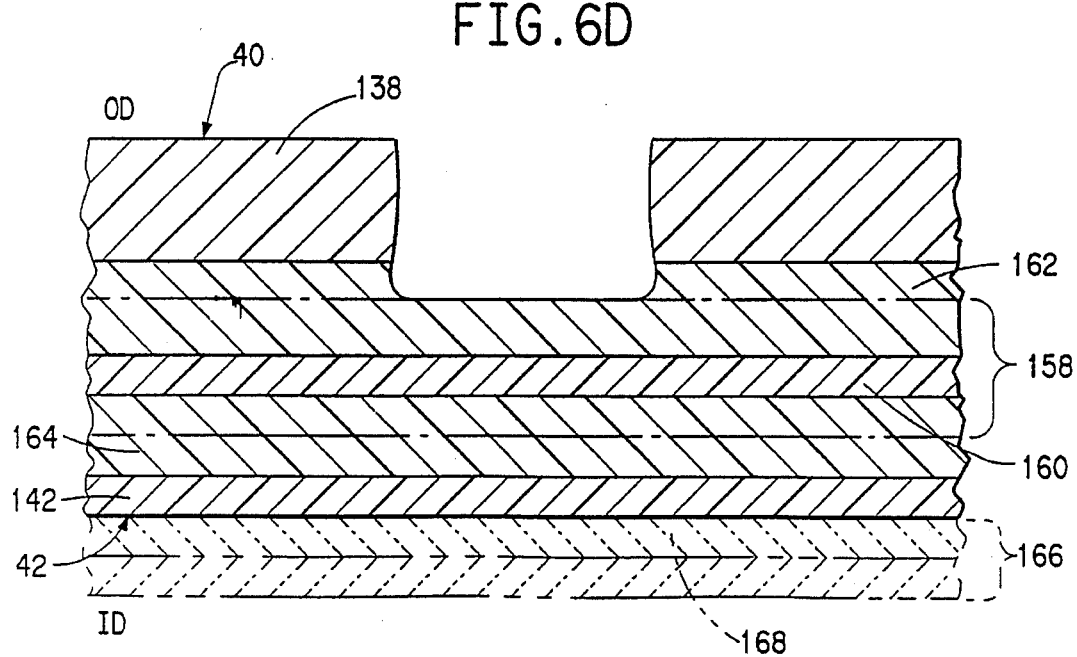

The spiral sleeves made on the tube winding machine as taught are further described referring to the full view of the sleeve in FIG. 6A and axial cross-section views of the sleeve wall thickness shown in FIGS. 6B, 6C and 6D. The axial cross-section views are taken along a line such as 6—6 of FIG. 6A. These cross-sections (except for the slot) are also typical in the circumferential direction. Referring to FIG. 6B, the sleeve consists of an outer structural layer 138 of a resinous material having a thickness 156, an adhesive layer 140 of a thermoplastic material having a thickness 150, and an inner Structural layer 142 of a resinous material having a thickness 154. The adhesive layer 140 is preferably a two-ply layer formed from the combining of pre-applied adhesive layers on the tapes 40 and 42 used to form the sleeve. Preferably, the adhesive layer pre-applied to each tape is at least 2 mils thick to assure good compliance and "wetting" at the joint so there are no pockets or skips in the joint across the width of the outer tape as the heated adhesive layers come together. The two plies are apparent when examining the layer 140 at the spiral gap 87 where the leading edge 144 of outer tape 40 is spaced from the trailing edge 146 of outer tape 40. The thickness 148 of the adhesive layer 140 at the gap 87 is only equal to the pre-applied adhesive layer on tape 42 which is less than the combined total thickness 150 of the adhesive layer. The gap, then, is defined by opposed side walls and a bottom wall. The side walls comprise the outer tape layer 138 of thickness 156 and a portion of the thermoplastic adhesive layer 140 which was preapplied to outer layer 138. The bottom wall comprises another portion of the thermoplastic adhesive layer 140 which was preapplied to inner tape layer 142. Note that the pre-applied adhesive layer on the outer structural layer 138 has not been deformed by the bonding process so that it flows into the gap formed between the leading edge and trailing edge of outer tape 40; that is, the portion of the gap formed between the edges of the pre-applied adhesive layer on structural layer 138 is not narrower than the portion of the gap formed between the edges of structural layer 138. It is believed this controlled deformation retains the uniformity of the pre-applied adhesive layer and results in a more uniform wall thickness in the final sleeve product. Line 152 represents the joint between the two pre-applied adhesive layers on the tapes, but this joint is not apparent in the layer 140 due to complete bonding of the adhesive layers. Note that the preapplied adhesive layer, having thickness 148, on the inner structural layer 142 has also not been excessively deformed by the heating and tube forming process; it does not cause the bottom wall of the gap 87 to bulge upward beyond the joint line 152. This likewise contributes to the uniform wall thickness of the final sleeve product. The relative thickness 150 of adhesive layer 140 compared to the combined structural and adhesive layer thicknesses, 150, 154 and 156, is an important feature of the sleeve product invention. In FIG. 6B, the adhesive layer is about 5 mils thick and the structural layers are about 7 mils and 3 mils thick. The relative adhesive thickness is 5/15 or 33%. The relatively thick adhesive layer is believed to serve two purposes:

1) it spaces apart the two structural layers which results in a higher wall thickness bending strength (stiffness) for the structure, considering the cross-section (excluding the gap) as a beam; the structural layers are farther from the neutral axis, or bending axis, of the "beam";

2) it provides a low cost, thickness-variable layer that permits the thickness of a given sleeve design to be easily varied to accommodate different thickness requirements without having to recalculate the expansibility strength. Therefore, a calculated amount of elastic expansion is provided while also providing a relatively stiff sleeve.

In the sleeves of the invention, the structural layers are concentrated away from the center of the cross-section, or using the beam analogy, away from the neutral axis of the beam. The weaker adhesive layers are concentrated near the neutral axis, which for simplicity can be regarded as near the geometric center of the thickness. Note also that the outer layer is typically the thicker of the structural layers. Preferably, the outer layer of the sleeve is at least 2.5 mils thick. This is beneficial to prevent damage to the outer diameter of the sleeve, which is the part of the sleeve most subject to damage such as cutting during its intended use as a print sleeve or a roll cover.

FIG. 6C shows another example of the sleeve invention where the inner structural layer 138a is a resinous material that is about 10 mils thick, the two-ply adhesive layer 140a is a thermoplastic material that is 20 mils thick, and the outer structural layer 142a is a resinous material that is about 10 mils thick. The relative adhesive thickness is 20/40, or 50%. Other sleeves may range from a small diameter, thick walled sleeve with about 70% adhesive to a large diameter, thin walled sleeve having about 25% adhesive.

In some cases, it may be desired to have a thicker walled printing sleeve while also changing the expansibility as long as the outermost layers continue to have the characteristics discussed with respect to the three-layer sleeves of FIGS. 6B and 6C; that is, two structural layers connected together by an adhesive layer that is 25% to 70% of the thickness of the three layers, and preferably the adhesive layer is a two-ply layer that is evidenced by the characteristic stepped adhesive structure in the outer gap. In this case, additional tapes can be added to a basic sleeve design. For instance, the sleeve of FIG. 6B may be modified by adding another inner layer tape as shown in FIG. 6D, so that a three tape sleeve is produced which would have five layers; three structural and two adhesive. The added tape may be one such as inner tape 158 that is comprised of a structural layer 160 of a resinous material with pre-applied adhesive layers on both top and bottom sides. The pre-applied adhesive layer on the top side of tape 158 would combine with the pre-applied adhesive layer on the bottom side of outer tape 40 to form two-ply adhesive layer 162; and the pre-applied adhesive layer on the bottom side of tape 158 would combine with the pre-applied adhesive layer on the top side of innermost tape 42 to form two-ply adhesive layer 164. The relative adhesive thickness of the three outer layers is now the sum of the two layers 162, which is about 5 mils, compared to the two outer structural layers that are about 7 mils, and about 3 mils; that is 5/15 or 33%. Note that as long as the tapes used have 25–70% adhesive, the entire multi-layer sleeve structure will have a relative adhesive thickness of 25–70%.

The sleeve may also be modified by the addition of a tape with only one adhesive layer that can be bonded to a structural layer, as long as it is not on the outer layer of the sleeve. For instance, the tape 166, shown in phantom in FIG. 6D, could be added so adhesive layer 168 is bonded to structural layer 142. This does not form as strong a joint as an adhesive-to-adhesive bond, but it is adequate for the inner layers of the sleeve, which are subject to less abuse compared to the outer surface. Note that if one of the tapes has two adhesive layers, such as tape 158, another tape may only contain a single resinous layer without adhesive.

The sleeves of FIGS. 6B and 6C both have an expansibility of at least 20 mils which is elastic. By 20 mils elastic expansion is meant the sleeve can be expanded diametrally 20 mils and held in the expanded state in use on a print cylinder or roll, and can be removed and recover to essentially its original diametral dimension. Little or no plastic deformation or creep has occurred. The sleeve can then be re-expanded and re-used, and again be removed and recover its original dimension. For a sleeve of 9¼ inch ID, a wall thickness of 40 mils, and a wall structure similar to FIG. 6C, a maximum elastic expansion of about 130 mils was observed.

The layer structure used for the sleeves of the invention form a surprisingly stiff structure for the amount of structural material used. Sleeves were evaluated using the CCTI (Composite Can and Tube Institute) Standard Testing Procedure T-128. The test measures side-to-side compression of the tubes and results in a "stiffness factor" of pounds per inch deflection per inch specimen length. For tubes under 12 inch inside diameter, the specimen length is 4 inches. Several sleeves of the invention ranging in inside diameter from 4.1 to 9.3 inches and varying in wall thickness from 15 mils to 41 mils were found to have better stiffness than some commercially obtained sleeves using a higher percentage of the same structural material; a contact adhesive material was used in the commercial sleeves.

What is claimed is:

1. In a method of forming a sleeve by spiral winding a plurality of tapes on a mandrel that includes the step of feeding the tapes from a source to the mandrel at an angle to form a tube and propelling the tube along the mandrel a distance greater than the width of the tape to form a continuous spiral gap in the outer surface of the tube, said gap being defined by opposed side walls, said side walls being leading and trailing edges of a tape being wound on the mandrel, the improvement comprising: sensing the width of said gap; comparing the gap width to a predetermined gap width; and slitting said tape as the tape passes from said source to said mandrel and changing the width of the tape to compensate for a deviation from said predetermined gap width.

2. The method of claim 1 wherein said tape is slit adjacent said mandrel.

* * * * *